March 3, 1936.                B. SETTEGAST ET AL                 2,032,893
                ARRANGEMENT FOR THE DIRECT INDICATION OF TIME
                   PERIODS, ESPECIALLY FOR ECHO SOUNDING
                            Filed May 2, 1931           2 Sheets-Sheet 2
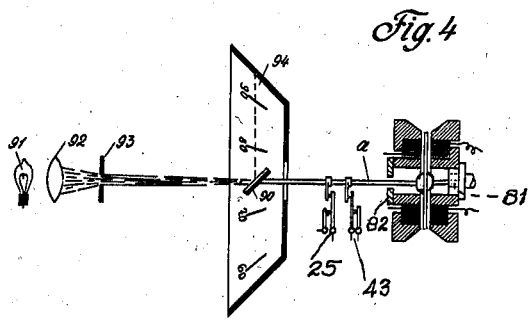
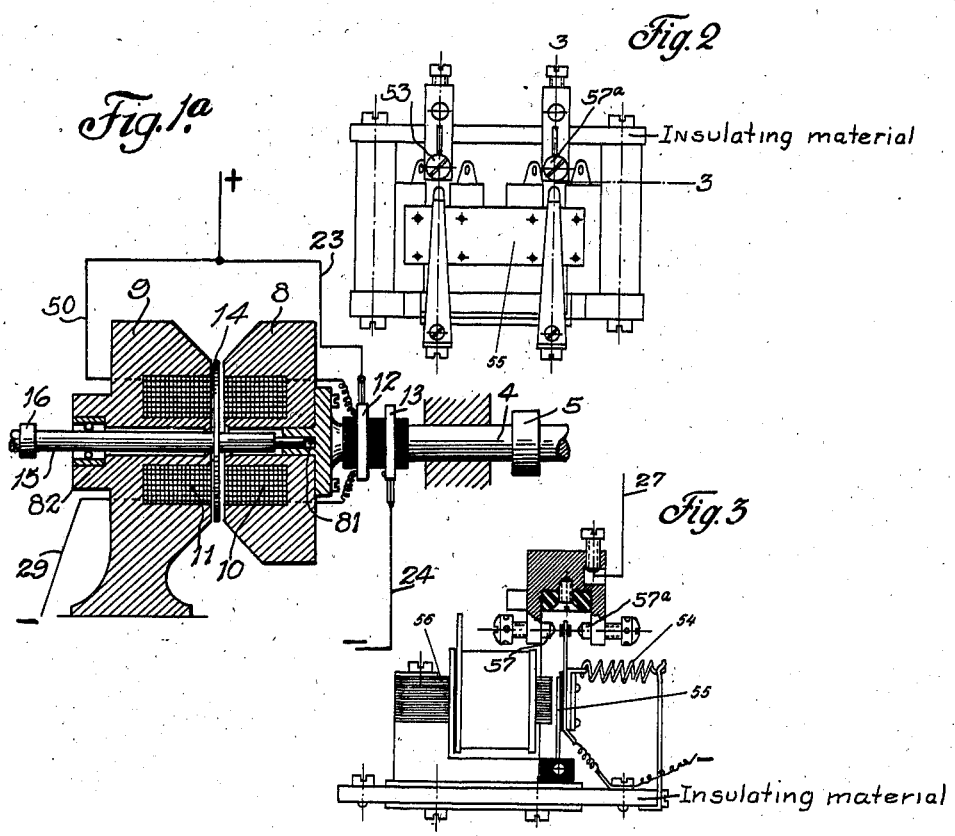

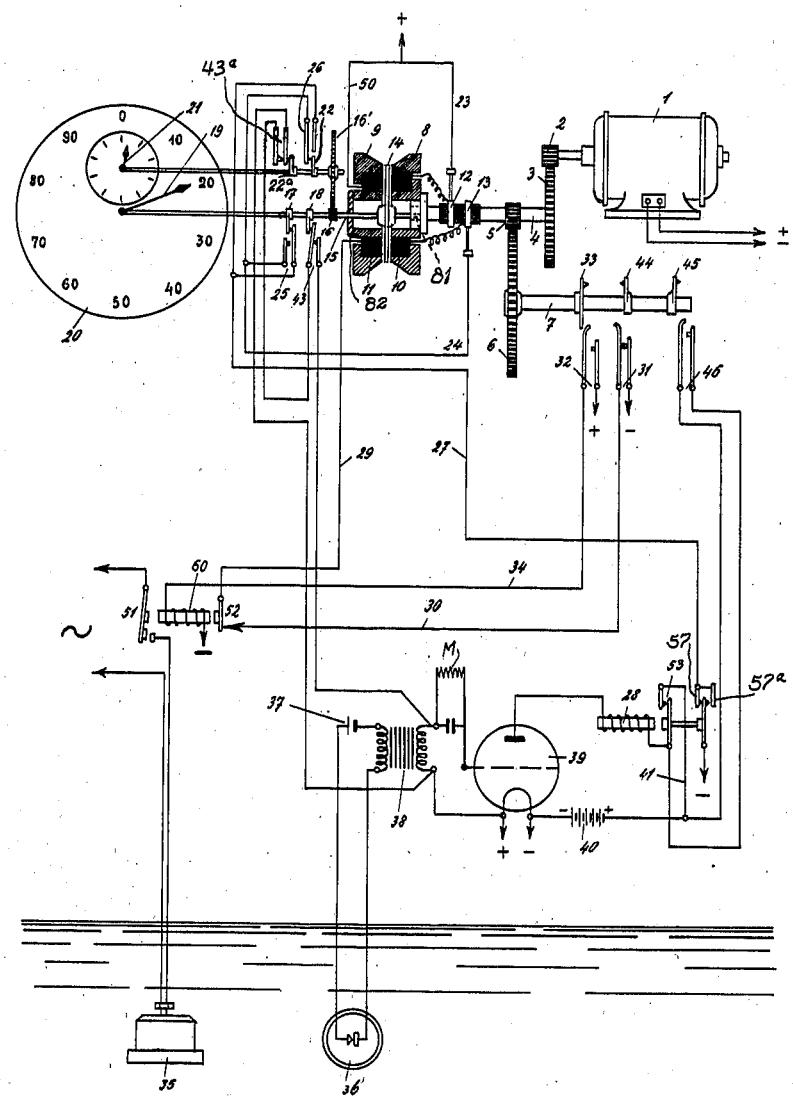
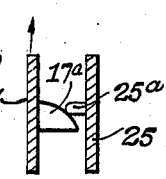

Patented Mar. 3, 1936

2,032,893

UNITED STATES PATENT OFFICE 2,032,893

ARRANGEMENT FOR THE DIRECT INDICATION OF TIME PERIODS, ESPECIALLY FOR ECHO SOUNDING

Bernhard Settegast and Wilhelm Rudolph, Kiel, Germany, assignors to Echometer Gesellschaft mit beschrankter Haftung, Kiel, Germany Application May 2, 1931, Serial No. 534,640
In Germany May 16, 1930

3 Claims. (Cl. 177—386)

The present invention relates to an apparatus for the measurement of very short and also longer time periods by electromagnetic means. The indication of time is effected by a mechanical pointer or hand which runs over a circular scale. Complete revolutions of this pointer are counted by a secondary pointer. Several devices are well-known which also couple a pointer during the time to be measured to a clockwork mechanism by electromagnetic means, namely through the medium of electromagnetically operated coupling members, and thus make possible and achieve time measurements, for long time measurements at least. For instance, Hipp's chronoscope described for instance in the "Zeitschrift für das Gesamte Scheiss und Sprengstoffwesen", published in Munich, Germany (see #9 of May 1, 1909 page 161 ff. and #10 of May 15, 1909 page 185ff.) can measure time periods of, say, several hundredths of a second up to several minutes duration. For very short periods, of the order of magnitude of thousandths of a second, this apparatus fails to work, however, because the coupling members have too much inertia, and the operation of which cannot be effected within the short measuring time with the magnetic forces available. Care is, of course, taken that the time taken to effect the coupling is equal to the time taken to effect the disengagement so that for longer time periods, both time lags cancel one another. Very short time periods, however, cannot be measured, as stated. It is obvious that a greater attracting force of the magnets and thus a greater acceleration of the coupling members may be obtained by increasing the magnetic field intensity or the current intensity of the magnets of such apparatus. This is limited, however, because sparks are produced at the switching contacts or the retarding action of extinguishing condensers, falsify the time measurement. A more accurate method whereby time periods of thousandths of a second may be measured is obtained according to the present invention by a change in the principle of construction, namely by a reduction of the inert masses to be moved. Whilst in the prior art time-measuring apparatus the armature of the coupling magnet, the transmitting rod system and the actual coupling between the driving movement and the indicating mechanism form three individual elements, these are combined, according to the present invention, into a single body. Instead of the three parts, only a flat round armature disc of very small mass need be operated. The disc is mounted on a thin spindle which carries the pointer for indicating the measured time periods. The disc with its pointer is arranged so as to be axially movable between the poles of two annular magnets situated opposite one another with a small intervening space. Of these magnets one is fixed whilst the other is rotatably mounted and maintained in rotation with a definite uniform speed by a driving mechanism (clockwork, motor or the like).

According as to whether the armature disc is firmly held by the one or the other magnet, the disc and pointer are stationary or rotate with the speed of the driving mechanism. The electrical connection of the magnets is effected best according to the closed-circuit current principle. Both magnet windings, in this case, are traversed by the closed-circuit current and coupling of the pointer is effected by a brief interruption of the closed-circuit current in each case in one of the magnet windings. If the armature disc is to be coupled to the rotating magnet, the circuit in the stationary magnet must be broken for a short time. If, vice-versa, the armature disc coupled to the moving magnet is to be brought to the position of rest, the closed circuit of the running magnet must be broken for a short time.

The use of annular magnets allows of a considerable reduction of the inert armature masses because, in contradistinction to other magnet arrangements, a considerably greater part of the total armature mass is permeated by magnetic lines of force than in any other type of electromagnet; consequently the ratio of the magnetically active to the magnetically inert armature mass becomes in the present case a very favourable one. In constructions executed, it was possible, with an armature weighing only 3 grammes, to increase the magnetic pulling forces by about 1000-times. In the case of an armature clearance of 0.2 mm., reversing periods of 1/4000 second can be attained.

The improvement of the magnetic efficiency allows of operating our novel short time meter with the very moderate power of a few watts. Such outputs can be furnished with certainty by the electron tubes usual in commerce, as are also employed for broadcast reception. It has been found advantageous, in this case, to place one or both annular magnet windings in the anode circuit of such an electron tube. By small voltage variations at the grids of the tubes, intense variations of the anode current from zero up to the full anode current are then obtained in well-known manner.

The use of electron tubes is necessary in all cases where the energy available for operating the new short-time meter is only small, such as, for instance, the echo of a sound or the muzzle explosion of a cannon firing at a great distance. For these cases, it has proved preferable to place before the grid of the electron tube a blocking condenser and to polarize it in such a way that the condenser plate remote from the grid is so strongly positively charged at the arrival of a sound impulse that the anode current of the tube, due to the negative charge of the grid, drops considerably or disappears altogether. Of course, also other arrangements of the electron tubes are possible, for instance, such as are used for directional amplifiers. If the arriving energy is so small that only a slight decrease of the anode current takes place, a minimum current circuit-breaker is preferably also connected in the anode circuit of the tube. Such a minimum current circuit-breaker is designed so that when the current flowing through its magnet and its energizing current falls below a certain limit, the breaker armature falls off and thereby completely breaks the relay energizing circuit.

For the reliable operation of the short-time meter, it is necessary for the current intensities to be approximately equal in both annular magnets. If this is not the case, irregularities due to different attracting forces of the two magnets and also measuring errors will arise. If it is desired to avoid this, the electron tube, the minimum circuit-breaker, and the magnet winding of the short-time meter are not connected in a common line, but the meter is separated and connected in a local circuit. In this case, the minimum current circuit-breaker must be provided with a further back contact which is connected to the corresponding annular magnet winding and an accumulator battery in the local circuit. Small fluctuations of the tube anode current, will now have no detrimental action on the magnets of the time-meter.

For the practical use of the short-time meter, it is necessary, after the pointer has been stopped on the dial to allow reading the result, to move the pointer automatically to the zero position. Usually, this has hitherto been effected by special heart-shaped restoring discs, keyed to the pointer spindle, which is engaged by a resilient pawl at restoration. Such restoring discs, however, increase the mass to be operated in an undesirable manner. According to the present invention, they can be avoided by not rotating the pointer back to the zero position in order to restore it to the initial position, but by setting it in motion, after the reading in forward direction, and letting it run as far as the zero position, and by automatically stopping it when this position is reached. For this purpose is arranged in the circuit of the running magnet an interrupting switch, called "zero-switch" in the following description, which is operated by cams on the shaft of the pointer. The operation of the zero-switch is effected a short time before the zero position is reached. Thereby the running magnet is rendered devoid of current and therefore the armature disc is attracted by the opopsite stationary magnet and held fast. It is clear that, when two pointers are provided, the main pointer counting the complete revolutions and the secondary pointer a multiple thereof, the arrangement of the zero-switch control must be extended to both pointers. If the zero-switch were controlled only by the faster running main pointer, then each time the latter reaches zero position, a stoppage would take place. In order to avoid this a second zero-switch must also be arranged for control by the slow-running pointer arbor and both zero-switches must be connected in parallel. In this arrangement, the stoppage only takes place when both pointers are at zero. For many purposes, for instance, for echo soundings in water or air, it is preferable to effect certain periodically recurring switching operations at the driving mechanism, clockwork or on the pointer shaft. Such switching operations are to be explained in the following practical example of an echo sounding apparatus.

In the drawings, which elucidate the invention by aid of an example of an echo sounding device, Fig. 1 shows the complete echo sounding arrangement according to the invention, Fig. 1a shows in longitudinal section and in larger scale the magnetic coupling 8, 9 of Fig. 1, Fig. 1b shows in larger scale the cooperation between cam 17 and its contact spring 28 in Fig. 1, the figure representing a horizontal section through the contacting portion between the arm and the spring, Figs. 2 and 3 show in detail and in larger scale respectively a back and a side elevation of relay 28 in Fig. 1, and Fig. 4 shows a modification of the arrangement of a short-time meter according to the invention employing a light beam as pointer.

Referring to Fig. 1, 1 denotes a small motor which drives the main shaft 4 with uniform speed through a pair of toothed wheels 2 and 3. To the shaft 4 is keyed a pinion 5 which meshes with the toothed wheel 6 and sets the shaft 7 in slow rotation. We shall return to the purpose of this shaft later.

First of all, we wish to consider the main shaft 4 which carries an annular magnet 8 fixed on its free end. The winding 10 of this magnet is connected to two slip rings 12 and 13 on which brushes slide, so that the annular magnet can be magnetized or demagnetized at will by the outside control circuits to be described presently.

At a small distance from, but coaxially with the annular magnet 8 is arranged a second annular magnet 9, identical in construction with magnet 8. Magnet 9 is stationary however, and the current supply to its winding 11 is effected through leads 29 and 50. In the gap between both annular magnets is arranged the disc-shaped armature 14, mounted on an arbor 15, journalled intermediate its ends in the supporting frame of stationary magnet 9, and at its inner end within rotatable magnet 10, in a bearing 81 in which it can longitudinally slide for a suitable distance.

In the drawings, armature disc 14 is situated in the field of the stationary magnet 9 and is therefore very firmly held by the latter. The arbor 15 carries, in addition to a small pinion 16, two small cam arms 17 and 18. The pointer 19 is firmly mounted on the free end of arbor 15. This pointer moves over a dial 20 with a scale division, which is illustrated in plan view at the left-hand side next to it. Furthermore, a small secondary pointer 21 is provided, which is driven through the aforementioned small pinion 16 which engages in a larger toothed wheel 16'. The secondary pointer 21 runs slower than the main pointer 19, corresponding to the gear ratio between the toothed wheels 16 and 16'; it serves to indicate the complete revolutions of the main pointer. It has already been mentioned in the preamble that both annular magnets 8 and 9 are traversed by the closed-circuit current. The closed-circuit current is supplied to the rotating magnet 8 from the positive pole of a battery (not shown), through the wire 23, sliding brush and slip-ring 12, magnet winding, slip-ring and sliding brush 13 to the wire 24 and furthermore through the two zero-switches 25 and 26 connected in parallel. Of the two aforementioned switches, only the zero-switch 25 is closed in the exact zero position of the pointer mechanism—in the drawings a position of the pointers which is different from zero is illustrated. For the sake of clearness and in order to indicate the manner of operation of these switches, the cam arms 17 and 22, operating switches 25 and 26 respectively are shown as having opened these switches, but in reality only switch 26 is open when both pointers are in exact zero position. As will be explained more fully hereinafter, switch 25, by suitably timing its cam arm 17 with relation to cam arm 22, is opened together with switch 26 only immediately before the zero position of pointer 19 is reached. The cam element of arm 17 is designed in the customary way for purposes of this kind, as shown in Fig. 1b at 17a, namely, in the form of an ordinary "drop cam", well-known in the art and commonly used for instance in the make and break devices in automobile ignition systems. This feature therefore forms no part of our present invention. Thus, when the cam arm 17 moves in the direction of the arrow shown in Fig. 1b, its cam 17a moves switch arm 25 first quickly to the right to open its circuit, but as soon as the small detent 25a, on arm 25 has reached the apex of the arm, it drops back immediately to the left, so that switch arm 25 immediately resumes its circuit closing position, and before the pointer reaches the actual zero position, so that the simultaneous "open" position of both switches lasts only long enough to deenergize magnet 8 for an instant to let go of armature disc 14. Therefore, energizing current passes again through the zero-switch 25 into the wire 27 and then through the contact 51 of the relay 28 to the negative pole of the source of current. Owing to this flow of current, the iron of the annular magnet 8 is again strongly magnetized. While the armature disc 14 is thus stopped, by being pulled onto and held by the stationary magnet 9, and while thereby the pointer system 19 and 21 is stopped, the armature system has enough momentum to coast for the very small time interval (negligible for the calculation) which elapses between the moment when both contacts 25 and 26 are simultaneously open and the moment when contact 25 is re-closed as aforedescribed, so that while now the pointer system is definitely stopped the re-magnetization of magnet 8 is re-established for further use. This arrangement operates very satisfactory and correctly in practice. In spite of this re-magnetization, however, the magnet cannot attract the armature disc 14 as this disc is now firmly held by the stationary magnet 9, by which it was attracted during the short interruption of the magnetization of magnet 8, above recited, because magnet 9 is also magnetized by a current which also flows from the positive pole of the source of current but through wire 50, the magnet winding 11, the line 29, the right-hand back contact 52 of the keying relay 60, the wire 30, spring contact 31 to the negative pole of the current source, the two aforementioned contacts 52 and 31 being thus connected in series, and being normally closed.

If the disc armature 14 with its arbor and the pointer is to be re-coupled to the running magnet 8, an interruption of the circuit last described is first necessary. Such an interruption is effected as soon as the keying relay 60 is excited. The excitation of the latter is accomplished by a brief circuit closure of the spring contact 32. The operation of the latter is accomplished by contact operating arm 33 which is mounted on the aforementioned shaft 7, and closes contact 32 when it is rotated 180° from the position shown. A flow of current now takes place from the positive pole at the right spring of the spring contact 32 through the wire lead 34 to the negative pole of the current source. The relay attracts both of its armatures, whereby magnet 9 is de-energized by opening of contact 52 between the lines 29 and 30 and furthermore a circuit is closed through the armature contact 51 of the relay, whereby for a short period flow of a current of a current source to the subaqueous sound transmitter 35 is effected.

Thus the actuation of the transmitter and also the coupling of the armature disc with its pointer to the rotating magnet 8 is simultaneously effected. The pointer now begins to move over the circular scale. We must now consider the arrangement for stopping the pointer. In the present practical example, this is to be effected by the echo from the bottom of the sea. A microphone receiver 36 is provided for the reception of the echo. This receiver is connected through a galvanic cell 37 to the primary winding of a small transformer 38. The secondary winding of the latter is connected in the well-known Audion connection to an electron tube 39. Since this circuit arrangement can be supposed to be commonly known, it will not be discussed in detail here.

It should be mentioned that the ohmic resistance M connected in parallel with the grid condenser must have an extremely high value of about 50 million ohms at the relatively small frequencies of the transmitter which are used in such cases. The normal anode current of the electron tube, which flows at the normal grid potential, i. e. when no signal impulse arises from microphone 36, flows from the positive pole of the anode battery 40 to the line 41, the contact 53 of the relay 28, through the winding of the latter to the anode of the tube and back to the negative pole.

The relay 28 (Figs. 2 and 3) connected between thermionic tube 39 and the magnetic coupling system of the short-time meter has in this arrangement a triple function. First of all, it secures the electrical separation between the tube circuits and the magnetic coupling circuits, and thereby avoids reactions upon tube grid, which might occur if the plate circuit of the tube were in direct electrical connection with the magnet circuits. Secondly, the relay constitutes an easy means of controlling the comparatively large amount of energy required for the magnetic coupling system (4 to 5 watts). With direct operation of the coupling system through a tube, an expensive high-power tube would have to be employed instead of an ordinary radio tube. The third factor of importance of the relay is based on its property as a minimum current switch for opening and closing the magnetizing circuit of magnet 8. The relay 28 is, as mentioned above, designed as a minimum relay. The retracting force of its armature which tends to open contact 53 is so dimensioned that, at a small decline of the tube anode current, the armature falls off and both contacts 53 and 57, whose arms are coupled, as shown in detail in Figs. 2 and 3 are interrupted. This occurs when the echo from the bottom of the sea meets the microphone 36 and therefore produces a negative charge on the grid of the electron tube. By dimensioning the withdrawing force of the spring 54 in Fig. 3 suitably, to pull the armature off contact 53 as such anode current decreases, it is easily possible to give this relay such a sensitivity as is suitable for the character of the disturbance and the echo intensity. For practical purposes, it has been found that a drop to ⅕ of the anode current is the best value for this. In order that the relay may fall off without detrimental time lag, the mass of its armature 55 is made very small, the air gap comparatively large and the magnet yoke 56 is constructed of laminated iron. It will be noted from Fig. 3 that the relay contact arm for contact 57, when it has been pulled off that contact by spring 54, is drawn against a counter contact 57ᵃ, electrically connected with contact 57, so that when contact 57, which controls the energizing current for magnet 8, is opened, that current is interrupted only for a short time.

As a result of the breaking of contact 57, and shortly thereafter the making of contact 57ᵃ, a temporary interruption of the closed-circuit current flowing in the line 27 and also in the winding of the annular magnet 8 occurs. During this period annular magnet releases the armature disc 14 and the latter is attracted by the magnetic field of the annular magnet 9 and firmly held by the latter, the energizing circuit of this magnet having been re-closed in the meantime at 52.

The pointer 19 stands still and now indicates the time which has elapsed between the emission of the sound and its return, and thus indicates the depth of water, which can be read off from the scale. In the position now reached, the pointer remains stationary for a time which is sufficient to read off the result easily.

It should also be added that the above-described receiving arrangement for the echo sound must be made ineffective during the sound emission of the subaqueous sound transmitter. To this end, a spring contact 43 is provided, which is operated by a cam arm 18 mounted on the pointer spindle.

The operation of arm 18 is so timed that during the sound emission, and for a short period after that, the spring contact 43 is closed, whereby the secondary winding of the transformer 38 is short-circuited. The pointer spindle which continues running, however, opens the short-circuit of the transformer after a certain time which, according to experience, is sufficient for the transmitter signal, so that, at the arrival of the echo, the receiving apparatus is ready for the reception of the sound.

Continuing now the description from the point where the pointer had been arrested at the arrival of the echo, it was stated there that the pointers should remain stationary for a sufficient time to permit the reading on dial 20. After this time has elapsed, however, the pointers should be set in motion again forward in order to bring them both to the zero mark for a new cycle of sounding operations. This means that for a moment the energizing of magnet 9, which at that time holds pointer disc 14 arrested, should be interrupted to give rotating magnet 8, held energized by the closed contact 57ᵃ an opportunity to attract disc 14 and to set the pointers running again. For this purpose the normally closed spring contact 31 is arranged in the circuit of magnet 9, which contact is opened when cam arm 44 on shaft 7 engages it. Arm 44 is timed so that this occurs at a time when one is sure that the signal of longest duration has arrived. By this temporary interruption of the energizing current of magnet 9, the disc armature 14 again becomes subject only to the field of the rotating magnet 8 and is attracted by the latter, so that the pointers start to run out of the arrested position, that is, the particular sounding indication. A check is put on this operation as soon as the main pointer 19 and also the secondary pointer 21 come into the proximity of the zero position. Here, spring contact 25 is opened for an instant while cam 17 wipes past it and contact 26 is opened by arm 22, and thus the energizing circuit of the magnet 8 is interrupted. The latter releases the armature disc, and magnet 9, reenergized in the meantime reattracts it, so that both pointers stand still in the zero position. The exact timing of contact arm 17 is such, that by the time disc 14 has been arrested by magnet 9 in the pointer zero position, arm 17 has already left its spring contact 25, as fully described hereinbefore, so that at least the latter contact is closed again and the magnet 8 reenergized ready for a new cycle of sounding operations.

In order to re-set the circuits for a new sounding, it still remains to return the relay 28, which had previously fallen off, into its attracted position. This is effected by means of the cam arm 45 which closes spring contact 46. This cam arm is so timed with relation to cam arm 33, that it functions before arm 33 starts a new cycle of sounding operations. The spring contact 46 is connected in parallel with the spring contact 53 of relay 28. Therefore, when contact 46 is closed the anode circuit of the electron tube 39 is completed again, and since the high ohmic resistance connected in parallel with the grid condenser has, in the meantime, allowed the negative charge of the grid to leak away, the normal anode current begins to flow again and the relay 28 attracts its armature, thereby closing contact 53, so that the armature remains attracted even after spring contact 46 is opened.

The new cycle of operations now begins as soon as contact arm 33 on shaft 7 temporarily closes spring contact 32 which controls the energizing of relay 60 as aforedescribed. In order to avoid a short-circuit of transformer 38 every time pointer 19 runs through zero on the dial, in which position it closes short-circuiting contacts 43, a second pair of contacts 43ᵃ is provided in series with contacts 43. Contacts 43ᵃ are closed by a contact arm 22ᵃ on the arbor of the secondary pointer 21, so that the transformer secondary can be short-circuited only when both contacts are closed, which occurs only at a time when both pointers are at zero and before they have started running against the transmitted signal. Expedients of this kind are old in the art, and this particular arrangement does not form a part of the present invention. It is used only on account of the presence of two dials. It is quite obvious, however, that all contact controlling cam arms on the several shafts and arbors are quite exactly timed with relation to one another so that the functions of the device described hereinabove are performed in the proper sequence. The particular position of each cam arm as shown in Fig. 1 may not be its exact position relative to the others for the particular operating condition appearing in the figure. They are shown in that figure merely each in relation to the individual element or elements which they control.

To shortly recapitulate the different stages of operation and condition of the system before, during and after a sounding operation, we have the following sequences.

1. Armature disc 14 located on stationary magnet 9, pointer system stands still, rotatable magnet 8 energized because, tube grid being normally positive, normal tube current flows through contact 53, energizing relay 28, and thus contact 57, controlling circuit of magnet 8 is closed.

2. Spring contact 32 temporarily closed by arm 33 to send a signal. Energizing of relay 60 simultaneously opens contact 52 and closes contact 51. The latter closes the transmitter, and opening of contact 52 de-energizes stationary magnet 9. Thus rotating magnet 8, being still energized, attracts disc 14 and starts pointer system running against the echo time.

3. Echo arrives at 36, makes for the moment tube grid negative, anode current drops and relay 28 drops contacts 53, 57 and thus temporarily opens energizing circuit of rotating magnet 8. During this temporary de-energization, magnet 9, having been re-energized in the meantime, attracts disc 14 and pointer system stops, indicating running time of sound.

4. Pointer system must be now reset to zero, after reading period has elapsed. This occurs by momentary opening of circuit for magnet 9 at contacts 31 by arm 44, which allows re-energized magnet 8 to attract disc 14 and turn the pointers, until both reach zero position, when their contact arms 17 and 22 open the energizing circuit of magnet 8 momentarily at 25 and 26. Disc 14 is drawn back to magnet 9 and arrested in pointer zero position.

5. Anode circuit is restored shortly before cam 33 introduces a new cycle of operation by cam 45 momentarily closing normally open contacts 46 thereby establishing a shunt to the still open contact 53, thus again completing the anode circuit of tube 39. Relay 28 is thereby re-energized, contact 53 now closed by the attraction of the relay armature, and the energizing of the relay is maintained by the anode current, now normal in the absence of a signal. The entire system is now ready for a new sounding operation.

If it is desired, in the described type of short-time meter, to avoid also the effects of the still remaining inertia and momentum of the pointer system upon the accurate functioning of the apparatus, it is also possible to employ, instead of a mechanical pointer, a light beam pointer, as illustrated, for instance, in Fig. 4. Here is fixed on the arbor a, which is equivalent with arbor 15 of Fig. 1, a small mirror 90 on which a beam of light is thrown by means of a well-known optical device (light source 91, lens 92, diaphragm 93) said beam being reflected on the scale 94 and travelling round onto the scale during rotation of arbor a.

In the same way it is desirable, for the entire liberation of the pointer spindle a for the pointer of the pointer mechanism, to choose a separate drive for large depths, which is directly driven by the shaft of the movement and is coupled and uncoupled by means of a device similar to the pointer shaft a.

The field of application of the described time-measuring device is not limited to the determination of distance by means of sound echo. On the contrary, it can also be used with advantage, for instance, for sound direction determination according to the three-point method (reception of the same sound at three remote receiving stations and measuring the time differences in its arrival), for timing purposes in sport, and also generally for the determination of the time interval between two operations or events, especially when they succeed one another at short intervals.

We claim:—

1. In an apparatus for directly measuring short travelling time intervals of released energy by starting and stopping of mechanical indicating devices, in combination with a constantly operating driving mechanism, an axially movable arbor and a pointer thereon, and a dial cooperating with said system, a pair of coaxially disposed annular field electromagnets spaced apart to form a gap between them, one magnet being stationary, the other being connected with said driving mechanism to rotate constantly, and circuits for normally energizing both of said magnets, a disc armature disposed in said gap and fixed on said arbor to rotate, axially shift or arrest said arbor according to the prevailing pull of said magnets, a contact mechanism and means, actuated by said driving mechanism for releasing the energy and for varying the relative field strengths of said magnets to expose said disc exclusively to the field of said rotatable magnet to start the pointer running against the energy travelling time, means responsive to the energy effects exerted at the point of arrival, and a second contact mechanism controlled by said responsive means and connected into the energizing circuits of said magnets for varying the relative field strengths of said magnets to expose said disc exclusively to the field of said stationary magnet to arrest the pointer at the arrival of the energy to permit the direct reading of the energy travelling time.

2. In an apparatus for directly measuring short travelling time intervals of released energy by starting and stopping of mechanical indicating devices, in combination with a constantly operating driving mechanism, an axially movable arbor and a pointer thereon, and a dial cooperating with said system, a pair of coaxially disposed annular field electromagnets spaced apart to form a gap between them, one magnet being stationary, the other being connected with said driving mechanism to rotate constantly, and circuits for normally energizing both of said magnets, a disc armature disposed in said gap and fixed on said arbor to rotate, axially shift or arrest said arbor according to the extent to which the disc is exposed to the full field of one or the other magnet, a contact mechanism and means actuated by said driving mechanism, for releasing the energy and for temporarily deenergizing the field of the stationary magnet, to expose said disc exclusively to the field of the rotatable magnet, to start the pointer running against the energy travelling time, means responsive to the energy effects exerted at the point of arrival, and a second contact mechanism controlled by said responsive means and connected into the energizing circuit of said rotatable magnet, for temporarily deenergizing the field of said rotatable magnet, to expose said disc exclusively to the field of the stationary magnet for arresting said pointer at the arrival of the energy to permit the direct reading of the energy travelling time.

3. In an apparatus for directly measuring short travelling time intervals of released energy by starting and stopping of mechanical indicating devices, in combination with a constantly operating driving mechanism, an axially movable arbor and a pointer thereon, and a dial cooperating with said system, a pair of coaxially disposed annular field electromagnets spaced apart to form a gap between them, one magnet being stationary, the other being connected with said driving mechanism to rotate constantly, and circuits for normally energizing both of said magnets, a disc armature disposed in said gap and fixed on said arbor to rotate, axially shift or arrest said arbor according to the extent to which the disc is exposed to the full field of one or the other magnet, a contact mechanism and means actuated by said driving mechanism, for releasing the energy and for temporarily deenergizing the field of the stationary magnet, to expose said disc exclusively to the field of the rotatable magnet, to start the pointer running against the energy travelling time, means responsive to the energy effects exerted at the point of arrival, and a second contact mechanism controlled by said responsive means, and connected into the energizing circuit of said rotatable magnet for temporarily deenergizing the field of said rotatable magnet, to expose said disc exclusively to the field of the stationary magnet for arresting said pointer at the arrival of the energy to permit the direct reading of the energy travelling time, and a second contact mechanism actuated by said driving mechanism and connected in the energizing circuit of said stationary magnet for again temporarily deenergizing said stationary magnet to throw said disc again to the rotatable magnet for resuming an idle-to-zero travel of said pointer, and contact control means on said arbor for temporarily deenergizing said rotatable magnet when the pointer has arrived in zero position.

BERNHARD SETTEGAST.
WILHELM RUDOLPH.